(12) United States Patent
Sprecher et al.

(10) Patent No.: US 11,339,506 B2
(45) Date of Patent: May 24, 2022

(54) METHOD FOR CONTROLLING A SERVICE UNIT

(71) Applicant: SAURER SPINNING SOLUTIONS GmbH & CO. KG, Übach-Palenberg (DE)

(72) Inventors: Jonathan Sprecher, Aachen (DE); Dirk Schiffers, Korschenbroich (DE)

(73) Assignee: Saurer Spinning Solutions GmbH & Co. KG, Übach-Palenberg (DE)

(*) Notice: Subject to any disclaimer, the term of this patent is extended or adjusted under 35 U.S.C. 154(b) by 0 days.

(21) Appl. No.: 16/866,838

(22) Filed: May 5, 2020

(65) Prior Publication Data
US 2020/0354860 A1 Nov. 12, 2020

(30) Foreign Application Priority Data
May 7, 2019 (DE) .......................... 102019111775.5

(51) Int. Cl.
D01H 13/14 (2006.01)
B65H 63/00 (2006.01)
G05B 19/04 (2006.01)

(52) U.S. Cl.
CPC ............ D01H 13/14 (2013.01); B65H 63/00 (2013.01); G05B 19/041 (2013.01); B65H 2701/31 (2013.01)

(58) Field of Classification Search
None
See application file for complete search history.

(56) References Cited

U.S. PATENT DOCUMENTS

| 4,753,665 A * | 6/1988 | Fahey | A47L 9/2857 96/408 |
| 5,277,295 A * | 1/1994 | Grecksch | D01H 9/001 198/457.01 |
| 2003/0056486 A1 | 3/2003 | Bahlmann et al. | |

* cited by examiner

Primary Examiner — Carlos R Ortiz Rodriguez
(74) Attorney, Agent, or Firm — Nelson Mullins Riley & Scarborough LLP

(57) ABSTRACT

A service unit is provided as well as a method for controlling a service unit performing various service activities at one workstation on a textile machine having several workstations, in which case the service activities and movement orders to be carried out by the service unit are prioritized by a controller unit. In order to provide a method for controlling a service unit performing various service activities and movement orders as well as a service unit with a controller device for carrying out movement orders and service orders, which enable adjustment and maintenance work to be carried out quickly on the service unit, there is provision for avoidance maneuvers and parking orders to be carried out with the highest priority and manually set service activities and movement orders to be carried out with high priority.

9 Claims, 1 Drawing Sheet

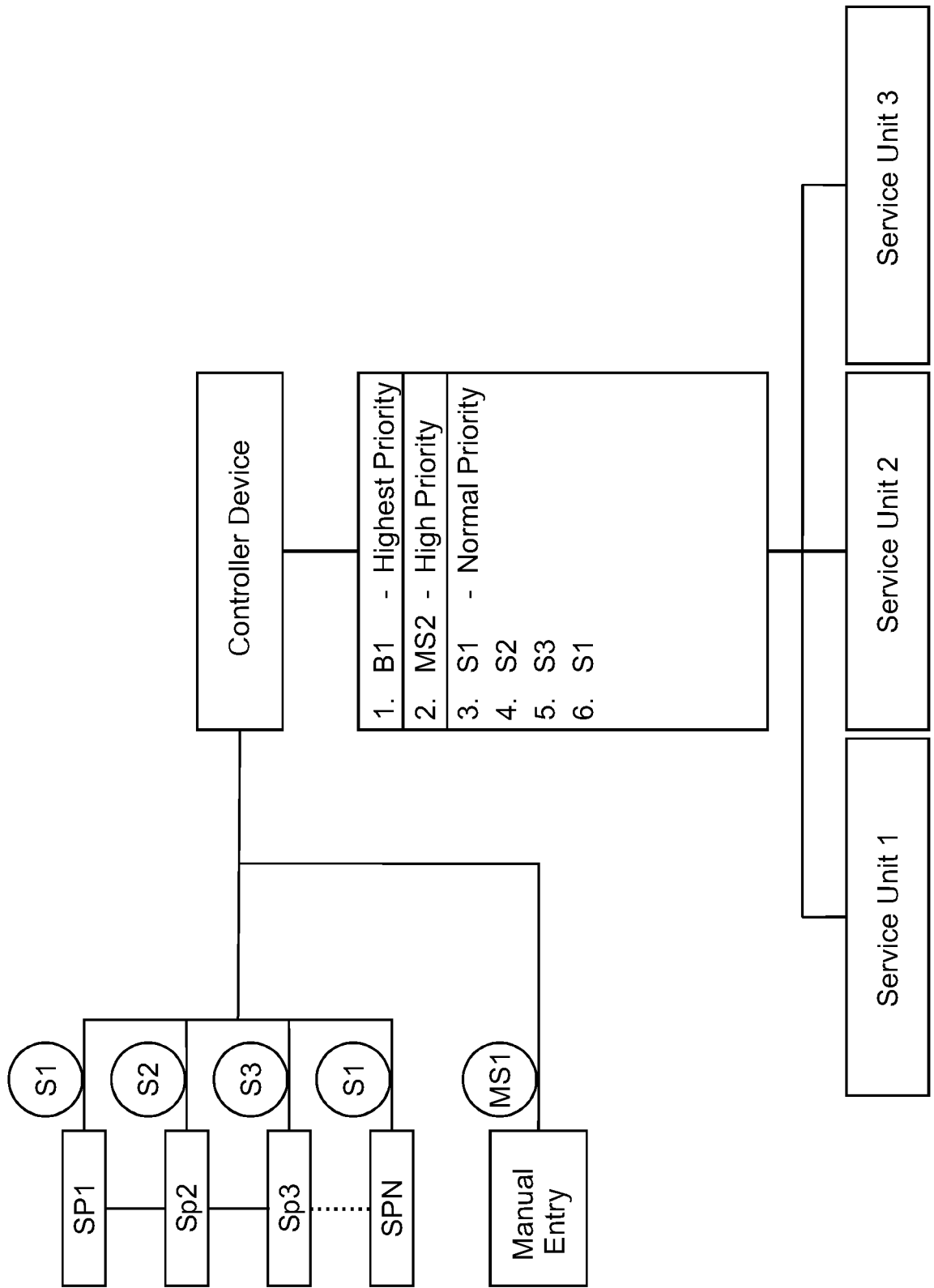

METHOD FOR CONTROLLING A SERVICE UNIT

CROSS-REFERENCE TO RELATED APPLICATION

This application claims priority from German National Patent Application No. DE 10 2019 111 775.5, filed May 7, 2019, entitled "Verfahren zur Steuerung eines Serviceaggregats", the entire contents of which are incorporated herein by reference.

FIELD OF THE INVENTION

The present invention concerns a method for controlling a service unit performing various service activities at one workstation on a textile machine having several workstations, such as a spinning machine or winder, in which case the service activities and movement orders to be carried out by the service unit are prioritized by a controller unit. The present invention further concerns a service unit with a controller device for carrying out movement orders and service orders at the workstations of a textile machine, such as a spinning machine or winder.

BACKGROUND OF THE INVENTION

Service units of the prior art of the aforementioned type are used in modern textile machines, in particular in spinning machines with a large number of spinning positions, in order to carry out different arising service activities automatically during operation of the spinning machine. The use of the service units enables the spinning machines to be operated particularly efficiently with only a very small number of personnel. The service activities to be carried out automatically by the service units include, for example, the insertion of an empty tube at the spinning positions of the spinning machine, laying of a thread on an empty tube and carrying out dust removal runs to clean the individual spinning positions. The number of service units used depends on the number of spinning positions of the spinning machine. When several service units are used on one spinning machine, it is necessary to coordinate their movement relative to one another in order to prevent conflicts between the service units during operation. For this purpose, movement orders such as avoidance maneuvers or parking orders can be provided to guarantee smooth operation.

The different service and movement orders of the service units are prioritized by a controller unit, which defines a ranking for the service activities to be carried out as well as movement orders. The service and movement orders to be defined in the ranking are not only orders generated automatically by the spinning positions but also manually triggered orders, for example from a member of the service personnel, in which case the sequence is defined by the controller unit.

The possibility of movement and service orders being created manually allows a member of the service personnel to make adjustments on the service units in order to guarantee that the service activities to be performed at the individual spinning positions are carried out in a trouble-free manner. For example, in order to guarantee that the service order for inserting an empty tube is carried out in a trouble-free manner, the catching pocket of the empty tube is aligned with the package cradle of the spinning position, which enables smooth insertion of the empty tube into the package cradle. Corresponding settings on the service units must be made individually for each spinning position, as there are deviations in the settings for the individual spinning positions due to component and production tolerances. Furthermore, operational wear and tear on the components means that adaptations must also be made during operation of the spinning machine in order to guarantee continuing trouble-free operation.

Especially after the new installation of a spinning machine, there is an increased need for adjustment by the service personnel performing the setup work, although this decreases with increasing operating time of the spinning machine. Malfunctions can also occur during operation, which must then be remedied by the service personnel by adapting and adjusting the service units.

In order for the adjustment work to be carried out by the service personnel, it is necessary in principle for the service personnel to have the service activity to be adjusted performed on the service unit. In the event of a service activity causing a malfunction, the member of the service personnel must be able to observe and evaluate this service activity at the respective spinning position and then make suitable adjustments. For this purpose, the member of the service personnel has the possibility of creating corresponding service orders manually in order to have them carried out at the corresponding spinning positions. Spinning machines of prior art, however, have the disadvantage that there are considerable waiting times for the member of the service personnel until the requested activity is carried out at the respective spinning position after previously automatically generated service orders and/or movement orders are processed.

SUMMARY OF THE INVENTION

The problem addressed by the present invention is therefore one of providing a method for controlling a service unit performing various service activities and movement orders as well as a service unit with a controller device for carrying out movement orders and service orders, which enable adjustment and maintenance work to be carried out quickly on the service unit.

The present invention solves the problem by a method for controlling a service unit performing various service activities at one workstation on a textile machine having several workstations, in which case the service activities and movement orders to be carried out by the service unit are prioritized by a controller unit, characterised in that avoidance maneuvers and parking orders are carried out with the highest priority and manually set service activities and movement orders are carried out with high priority.

The present invention solves the problem by a service unit with a controller device for carrying out movement orders and service orders at the workstations of a textile machine, characterised in that the controller device prioritizes the service activities and movement orders to be carried out by the service unit in such a way that avoidance maneuvers and parking orders are carried out with the highest priority and manually set service activities and movement orders are carried out with high priority.

Advantageous further developments of the present invention are also set forth herein.

It is characteristic of the method according to the present invention for controlling a service unit performing various service activities at a workstation of the textile machine, in particular at a spinning or winding position, that avoidance maneuvers and parking orders are carried out with the highest priority and manually set service activities and movement orders are carried out with high priority.

Based on the method according to the present invention, the controller device defines the processing sequence of the pending service and movement orders. Avoidance maneuvers and parking orders are assigned the highest priority, so that even if a member of the service personnel carries out adjustment work during operation of the textile machine, trouble-free operation is still guaranteed because avoidance maneuvers and parking orders, which prevent a conflict with neighboring service units, are carried out with the highest priority. Based on the method according to the present invention, there is furthermore provision for all manually set service activities and movement orders to be carried out with high priority. This ensures that the activities or movement orders of the service units requested by service personnel in the course of adjustment, maintenance or setup work are carried out at short notice, thereby allowing the member of the service personnel to efficiently carry out the activities that are to be undertaken by him/her, in particular adjustment work or adaptation work. The embodiment according to the present invention thus prevents long waiting times for the member of the service personnel, with a considerable time saving being achieved for the member of the service personnel, especially during lot changes, because he/she can immediately test whether the service unit is working at the respective workstation in the specified manner.

Compared to the disclosed, state-of-the-art definition of the sequence of movement orders and service activities, which leads to the situation that service personnel can only start the work to be carried out after all previous orders have been processed, the productivity of the personnel member is thus increased considerably, while at the same time the reliability of the textile machine, such as a spinning machine or winder in particular, is guaranteed. Due to the reduced waiting times resulting from the embodiment according to the present invention, maintenance work can be carried out more cost-effectively, efficiently and quickly by the member of the service personnel.

According to the present invention, this results from the controller unit's prioritization of all pending service activities and movement orders, in which case the manually created orders in particular are carried out in a preferred manner due to their high priority. The controller unit can be an external (central) controller unit, which is arranged externally to the service unit and set up to control one or more associated service units, or an internal controller unit, which is arranged directly on the service unit and designed to control it.

In principle, all manually created service orders of the service unit can be assigned high priority. According to a particularly advantageous embodiment of the present invention, however, there is provision for, in particular, the service order for inserting an empty tube and/or the service order for laying a thread on the empty tube to be carried out with high priority. This embodiment guarantees that these main service activities of the service units are carried out in a particularly preferred manner in the event of a manual request. Reliable operation of the textile machine is especially guaranteed because these two service activities are of primary importance for the operation of the textile machine. A prioritization of the service orders issued by the member of the service personnel according to this further development of the present invention guarantees that the member of the service personnel can immediately start the testing and, if necessary, adjustment of the service activities essential for efficient and smooth operation of the textile machine, and that these can be completed in a timely manner.

In order to guarantee in a particularly advantageous way that the service activities and movement orders requested by the service personnel are carried out in a timely manner, there is furthermore provision, according to a further development of the present invention, for the service order for carrying out a dust removal run to be carried out with medium priority. A requested dust removal run is treated as subordinate because of its lower, namely medium, priority compared to the service activities and movement orders carried out with high priority issued manually by the member of the service personnel, with the effect that the work and checks to be carried out by the latter can be carried out in a particularly timely and effective manner before the dust removal run is carried out.

In order to especially guarantee the effectiveness of the member of the service personnel, there is furthermore provision, according to a further advantageous embodiment of the present invention, for service orders generated automatically by the workstations, such as the insertion of an empty tube or the laying of a thread on the empty tube, to be carried out with normal priority, which in a complementary manner increases the efficiency of the activities of the member of the service personnel within the scope of the adjustment and checking activities that he/she has to carry out, as the automatically generated orders are only carried out after the manual orders have been completed.

It is characteristic of the service unit according to the present invention, having a controller device for carrying out movement orders and service orders at the workstations, such as in particular at the spinning or winding positions of the textile machine, that the controller device prioritizes the service activities and movement orders to be carried out by the service unit in such a way that avoidance maneuvers and parking orders are carried out with the highest priority and manually set service activities and movement orders are carried out with high priority. The service activities which can be set manually can generally ideally be entered directly at the spinning position or at a unit arranged externally to the spinning position, by means of which service activities can be set for more than one spinning position. Direct entry at the spinning position is preferred, as manual entry at the spinning position obviates the otherwise necessary additional entry or assignment of the service activity which can be set manually for a corresponding spinning position, thus eliminating a potential error source, such as entering an incorrect spinning position number.

The service unit according to the present invention is connected to a controller device which controls it and regulates the processing of the work to be carried out by the service unit. The controller device can be an external (central) controller device, which is arranged externally to the service unit and set up to control one or more associated service units, or an internal controller device, which is arranged directly on the service unit and designed to control it. According to the present invention, there is provision for the controller device to carry out the avoidance maneuvers and parking orders, which prevent conflicts with other service units, with the highest priority, with the effect that trouble-free operation of the textile machine and the service units is guaranteed. Service activities and movement orders requested manually by a member of the service personnel, for example, are then carried out subordinately with high priority, so that it is guaranteed that the member of the service personnel can carry out checking and adjustment work to be undertaken on the service unit without long waiting times, for example even if service orders generated automatically by the workstations are present.

The service unit according to the present invention thus enables the member of the service personnel to, if necessary, check, adapt and adjust the service unit at the workstation selected or specified by him/her without loss of time.

It is particularly advantageous that the controller device prioritizes the manual service order for inserting an empty tube and/or for laying a thread on the empty tube in such a way that these are carried out with high priority. A prioritization of these service activities in particular guarantees that these service activities can be checked at short notice and, if necessary, adjusted at the respective workstation. The service orders, insertion of an empty tube and laying of the thread, are basic service orders which are of particular importance for high efficiency of the textile machine with a high degree of automation.

Furthermore, it is advantageous according to a further development of the present invention that the controller device prioritizes the service order for carrying out a dust removal run in such a way that it is carried out with medium priority. The medium priority, which is subordinate to the high priority, guarantees that in any event, manual checks or adaptations are carried out before a dust removal run is carried out, the latter being carried out after all orders with the highest and high priority have been processed. The dust removal run is also necessary for the operation of the textile machine in order to prevent malfunctions at the individual workstations.

According to a further embodiment of the present invention, there is provision for the service orders generated automatically by the workstations to be prioritized in such a way that they are carried out with normal priority. The automatically generated service orders are therefore only processed after the orders with the highest, high and medium priority have been carried out, thereby guaranteeing in any event that activities can be carried out immediately or with only a short delay by the member of the service personnel at workstations that may have problems.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

An embodiment example of the present invention is explained below with reference to the drawing. In the drawing:

FIG. 1 shows a schematic view of a flowchart defining the sequence of the service activities and movement orders provided for a service unit.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

The flowchart depicted in FIG. 1 schematically shows the processing of the movement and service orders sent to the controller device, which are passed on to the associated service unit(s). The controller device can be an external control device, which is arranged externally to the service unit and set up to control one or more associated service units, or an internal control device, which is arranged directly on the service unit and designed to control it.

In the present embodiment example, all service orders S1, S2, S3 generated automatically by the individual workstations, such as in particular by spinning or winding positions SP1, SP2, SP3, SPN, are transmitted to the controller device. In addition, a member of the service personnel has the possibility of requesting a service activity MS1 by making a manual entry. Within the controller device, the service orders sent to the controller device and any movement orders possibly generated on the basis of the service orders are combined into a processing sequence according to the prioritization rules stored in the controller device.

In the example depicted, an existing movement order for carrying out an avoidance maneuver B1 has the highest priority and is at the top of the processing ranking. A service order MS1 set by a member of the service personnel for inserting an empty tube occurs after the movement order B1, as the service order MS1 is assigned to the high category in the processing sequence. The service orders S1, S2 and S3 generated automatically by the workstations are carried out with subsequent priority and are passed on by the controller device to the correspondingly associated service units 1 to 3.

By prioritizing the manual service activity MS1 before the automatically generated service orders S1 to S3, it is guaranteed that the service order requested by the member of the service personnel is performed without waiting times, so that the member of the service personnel can check the service activity MS1 and, if necessary, make adjustments on the service unit.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method for controlling a service unit performing various service activities at one workstation on a textile machine having several workstations, in which case the service activities and movement orders to be carried out by the service unit are prioritized by a controller unit, characterised in that an avoidance maneuvers and a parking orders are carried out with a higher priority than a manually set service order and a movement order.

2. The method according to claim 1, characterised in that the service order is inserting an empty sleeve.

3. The method according to claim 1, characterised in that the service order is laying a thread on the empty tube.

4. The method according to claim 1, characterised in that the service order is carrying out a dust removal run.

5. The method according to claim 1, characterised in that automatically generated orders are only carried out after the manually set orders have been completed.

6. A service unit with a controller device for carrying out movement orders and service orders at the workstations of a textile machine, characterised in that the controller device prioritizes the service activities and movement orders to be carried out by the service unit in such a way that an avoidance maneuvers and a parking orders are carried out with a higher priority than a manually set service order and a movement order.

7. The service unit according to claim 6, characterised in that the manual service order is for inserting an empty tube and/or for laying a thread on the empty tube.

8. The service unit according to claim 6, characterised in that the service order is for carrying out a dust removal run.

9. The service unit according to claim 1, characterised in that automatically generated orders are only carried out after the manually set orders have been completed.

* * * * *